United States Patent

[11] 3,623,602

| [72] | Inventor | Anthony S. Valente<br>Bernardsville, N.J. |
|---|---|---|
| [21] | Appl. No. | 864,817 |
| [22] | Filed | Oct. 8, 1969 |
| [45] | Patented | Nov. 30, 1971 |
| [73] | Assignee | Quantum Industries, Inc.<br>Fairfield, N.J. |

[54] COMBINATION PACKAGE AND TEMPLATE FOR THIN-LAYER CHROMATOGRAPHIC PLATE
10 Claims, 5 Drawing Figs.

[52] U.S. Cl.................................................. 206/46 R,
73/61.1 C, 206/45.34, 206/80, 210/198 C
[51] Int. Cl................................................... B65d 73/00,
B01d 15/08, G01n 31/08
[50] Field of Search............................................ 206/46 R,
45.34, 80, 62; 73/61.1 C; 210/198 C, 31 C

[56] References Cited
UNITED STATES PATENTS

| 3,420,405 | 1/1969 | Taylor | 206/62 X |
| 2,776,787 | 1/1957 | Nicol | 206/DIG. 18 UX |
| 2,138,241 | 11/1938 | Koch et al. | 206/45.34 X |

FOREIGN PATENTS

| 1,037,867 | 8/1966 | Great Britain | 73/61.1 C |

*Primary Examiner*—Leonard Summer
*Attorney*—Samuelson & Jacob

ABSTRACT: A thin-layer chromatographic plate is packaged between a backing member and a pliable plastic film adhered to marginal portions of the backing member around the perimeter of the plate, the marginal portions of the backing member carrying indicia including a spotting guide juxtaposed with an end of the plate and a migration gauge juxtaposed with at least one side of the plate.

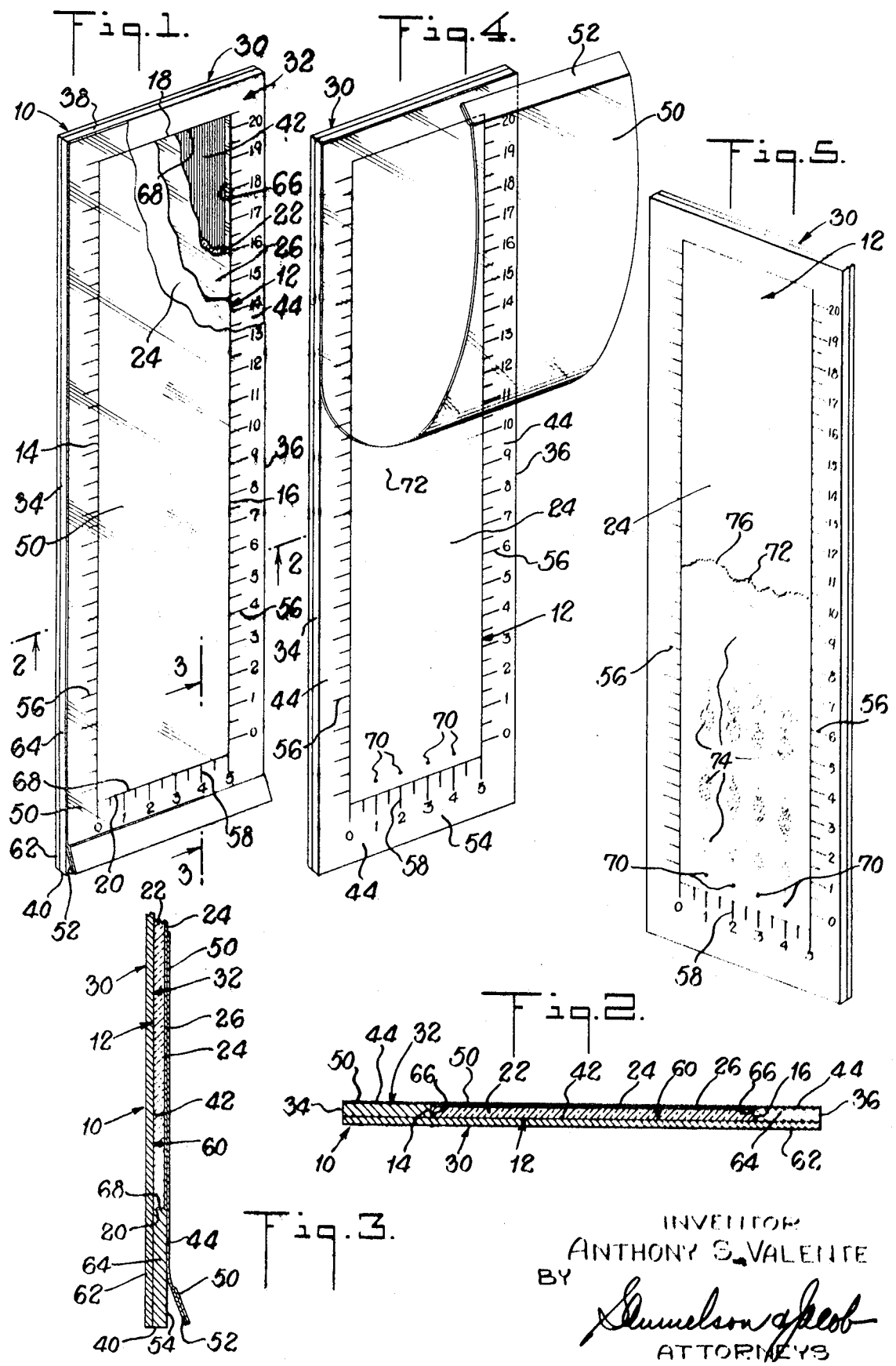

COMBINATION PACKAGE AND TEMPLATE FOR THIN-LAYER CHROMATOGRAPHIC PLATE

The present invention relates generally to the handling and use of thin layer chromatographic plates and pertains, more specifically, to a package for a thin-layer chromatographic plate which also serves as a template in the use of the plate.

Thin-layer chromatographic plates are now well-established tools in the analysis of unknown mixtures to determine the constituents of such mixtures. These plates are usually in the form of a relatively thin, rectangular plate of glass carrying a surface layer of a chromatographic adsorbent.

Ordinarily, portions of the unknown mixture, in liquid solution are placed upon the adsorbent layer at prescribed locations adjacent an end of the plate in an operation known as "spotting." Then the plate is "developed" by placing the spotted end of the plate in a solvent. The solvent will then travel along the adsorbent layer by capillary action and the unknown mixture deposited in the spots will be drawn or "migrate" with the solvent. As the solvent travels through the layer of adsorbent, form one end toward the other end of the plate, some constituents of the mixture will be adsorbed and will leave telltale spots at different locations as others are carried along by the solvent to leave developed spots at further locations along the path of travel of the solvent. When the solvent front, i.e., the boundary between the area of the adsorbent layer already wetted by the traveling solvent and the further area yet to be wetted, reaches a predetermined location along the layer of adsorbent, the plate is removed from the solvent and the pattern of developed spots is examined. By comparison of the developed pattern of telltale spots with corresponding chromatographic patterns obtained from solutions of known constituents, the individual constituents of the unknown mixture may be determined.

Because thin-layer chromatographic plates are usually constructed of rather thin, fragile glass which is easily cracked or shattered and because the layer of adsorbent is also rather fragile, both from the standpoint of withstanding mechanical injury, such as abrasion, chipping, scraping, or wiping, as well as chemical injury, such a contamination, excessive moisture or interaction with contacted materials, it becomes necessary to protect these plates from such injuries during transportation, handling, and use.

It is therefore an important object of the invention to provide a package for a thin-layer chromatographic plate which not only protects the plate against injury during transportation, but facilitates the handling and use of the plate for its intended purpose.

Another object of the invention is to provide a combination package and template for thin-layer chromatographic plates which protects the plate against injury and contamination prior to use and simplifies the procedures for the use of the plate in a thin-layer chromatographic analysis.

A further object of the invention is to provide a combination package and template as set forth above which is readily employed to protect a thin-layer chromatographic plate against injury after the plate is developed, as well as prior to use in an analysis and during spotting operations.

The above objects, as well as still further objects and advantages are attained by the invention which may be described briefly as a combination package and template for a thin-layer chromatographic plate, the plate having a perimeter of prescribed length and including a thin layer of chromatographic adsorbent, the combination comprising a backing member including a thin layer of the combination comprising a backing member including a front surface having a perimeter of a length greater than the length of the perimeter of the plate to be packaged, the front surface having a first portion corresponding in area and configuration to the area and configuration of the plate and a second portion forming a marginal area between the first portion and at least a portion of the perimeter of the front surface of the backing member, indicia located in the marginal area and juxtaposed with the first portion for denoting locations on the adsorbent layer of the plate to be packaged, means on the backing member for positively locating the plate upon the first portion of the front surface of the backing member in a predetermined position with respect to the indicia, and a film of pliable plastic material overlying the first and second portions of the front surface area and removably affixed to the backing member when the plate is in the predetermined position upon the backing member for removably retaining the plate in that predetermined position between the film and the backing member.

The invention will be more fully understood and further objects and advantages thereof will become apparent from the following detailed description of an embodiment of the invention illustrated in the accompanying drawing, in which:

FIG. 1 is a perspective view of a combination package and template constructed in accordance with the invention and shown with a thin layer chromatographic plate packaged therein;

FIG. 2 is an enlarged cross-sectional view taken along line 2—2 of FIG. 1;

FIG. 3 is an enlarged cross-sectional view taken along line 3—3 of FIG. 1;

FIG. 4 is a view similar to FIG. 1 with the film of the package partially removed; and FIG. 5 is a perspective view of a developed thin-layer chromatographic plate located on the backing member of the package.

Referring now to the drawing, and especially to FIGS. 1 through 3 thereof, a combination package and template for a thin-layer chromatographic plate and constructed in accordance with the invention is illustrated at 10. A thin-layer chromatographic plate is shown in the form of a rectangular plate 12 having opposite sides 14 and 16 of prescribed length and opposite ends 18 and 20 of prescribed width. Plate 12 is constructed of a glass sheet 22 which carries a layer 24 of a chromatographic adsorbent on the front surface 26 thereof.

The thin-layer chromatographic plate 12 is placed upon a backing member 30 which may be made relatively rigid or stiff so as to provide a support for plate 12 of sufficient rigidity to protect the plate against excessive bending or other forces which could crack, chip, shatter or otherwise damage the plate.

The backing member 30 has a front surface 32 bounded by opposite sides 34 and 36 and opposite ends 38 and 40 corresponding to the sides and ends of the plate 12, but being longer so that the perimeter of the backing member 30 is greater than the perimeter of the plate 12 and the area of the front surface 32 of the backing member 30 is greater than the corresponding area of the front surface 26 of the plate 12. The plate 12 is located upon a first portion 42 of the front surface 32 of the backing member, which corresponds in area and configuration to the area and configuration of the plate and therefore has sides and ends corresponding to and coincidental with the sides and ends of the plate. A second portion 44 of the front surface area 32 extends around the perimeter of the plate 12 to surround the plate with a marginal area which lies between the perimeter of the plate 12 and the perimeter of the backing member 30.

A film 50 of pliable plastic overlies the front surface of the backing member 30 and the plate 12 and is shown affixed to the backing member by being adhered to the portion 44 of the front surface 32 of the backing member so as to secure the plate 12 in place upon surface portion 42 of the backing member between the film and the backing. Preferably, the film 50 adheres to the portion 44 of the front surface 32 completely around the perimeter of the plate 12 so as to seal the plate within the package.

Conventional skin-packaging procedures may be employed to draw film 50 into place over the plate 12 and backing member 30 and seal the package. Thus, backing member 30 is advantageously fabricated of a material such as cardboard that will permit the use of a vacuum which draws the film into place over the backing member and plate, while the material for film 50 is chosen from among available plastic films which will not have a deleterious interaction with the layer 24 of chromatographic adsorbent. Among these plastics are the ionomer resins, a particularly suitable resin being a film known as "Surlyn A," made available for skin packaging by E. I. du Pont de Nemours & Co., Inc. Heat is applied to the film to conform the film to the upper surfaces of the backing member and the plate, but is applied primarily to the portions of the film overlying the portion 44 of the front surface 32 to attain the desired adherence of the film to the backing member around the perimeter of the plate, while preferably precluding adherence of the film to the adsorbent layer 24. The film 50 is preferably transparent to reveal the condition of the plate 12 and the adsorbent layer 24 thereof when visually inspected.

The adherence of the film 50 to the portion 44 of the front surface 32 of the backing member 30 is such that the film may be selectively removed by merely peeling the film form the backing member. In order to facilitate such peeling of the film 50 from the backing member 30 and the exposure of the plate 12 for use, a tab 52, preferably made of paper or cardboard, is located at the lower end 40 of the backing member 30 and lies between the film 50 and a further portion 54 of the front surface 32 of the backing member so that the film will be adhered to the surface of the tab, rather than to the further surface portion 54 (see FIG. 3) of the backing member. The tab 52 is not adhered to the surface of the backing member and provides a finger grip which may be manually lifted and gripped to facilitate removal of the film as seen in FIGS. 3 and 4. The tab 52 is spaced a sufficient distance from the lower end 20 of the plate 12 to provide the necessary area of surface portion 44 adjacent the lower end 20 of the plate 12 for adherence of the film to the backing member front surface between the lower end 20 and the tab 52.

The use of the plate 12 in a chromatographic analysis is facilitated by placing indicia in the marginal area of the front surface of the backing member which serve to denote specific locations on the adsorbent layer 24. Thus, a series of index marks and numerals are juxtaposed with at least one of the sides of the plate 12, as by printing upon the marginal area of the front surface of the backing member, and preferably juxtaposed with both sides 14 and 16, to establish a scale which serves as a migration gauge 56. Similarly, a plurality of index marks and numerals are juxtaposed with the lower end 20 of the plate 12 to establish a spotting guide 58.

Means are provided on the backing member for positively locating and holding the plate 12 in a predetermined position with respect to the migration gauge and the spotting guide, both during packaging of the plate and during use of the plate, and are shown in the form of a recess 60 formed by locating the first portion 42 of the front surface 32 of the backing member 30 in a plane located below the plane of the second portion 44 of the front surface. Hence, the first portion 42 is recessed relative to the second portion 44 of the front surface 32. In the illustrated embodiment, the backing member 30 is fabricated by laminating a lower layer 62 of material, such as chip board, to an upper layer 64 which has been previously die-cut to form the peripheral edges 66 and 68 of the recess 60 which correspond, respectively, to the length and width of the plate 12. Thus, in the assembly of the package, the plate 12 is merely placed within the recess 60 where it is retained by edges 66 and 68 against lateral and longitudinal displacement on the backing member, and especially relative to the marginal area of the front surface thereof and the indicia printed on the marginal area, until the film 50 is placed over the plate 12 and the backing member. Preferably, the depth of the recess 60 is approximately the same as the thickness of the plate 12, but some variation in depth relative to the thickness of the plate has not been found to be objectionable.

In order to use the plate 12, the tab 52 is grasped and the film 50 is peeled away from the backing member 30 and the plate 12 until the lower end of the plate 12 is exposed, as seen in FIG. 4. Spots 70 of a solution of unknown constituents are then placed at specific locations on the adsorbent layer 24 with the aid of the spotting guide 58, which locates the spots 70 laterally on the plate, and migration gauge 56, which locates the spots 70 longitudinally on the plate. Thus, spots 70 are shown located at the zero position on the migration gauge and at the one, two, three, and four positions on the spotting guide. A mark 72, such as a pencil mark, is then made at some prescribed location further along the adsorbent layer 24, in this instance at the location denoted by the numeral 10 on the migration gauge, and the plate 12 is removed from the package by completely stripping the film 50 from the backing member 30 to fully expose the plate.

The plate is then removed from the recess 60, the lower end 20 of the plate is then placed in a suitable solvent and the solvent front is allowed to advance upwardly through the adsorbent layer 24, picking up the spots of unknown solution along the way and carrying the unknown constituents toward the mark 72 to develop a chromatographic pattern. Various constituents will be adsorbed at various longitudinal locations to establish a pattern of spots 74 (see FIG. 5) of different colors. When the solvent front 76 (see FIG. 5) reaches the predetermined location at mark 72, the plate is considered fully developed and is removed from the solvent. By once again placing the developed plate 12 into recess 60, the plate is readily located in its previous position on the backing member 30, as seen in FIG. 5, and the locations of the various developed spots 74 may be accurately measured and recorded by reference to the migration gauge 56. These locations are then employed to identify the various constituents of the unknown solution. In order to preserve the developed plate and facilitate its handling during identification and further use of the plate after the developing operation, the plate may be dried and further transparent plastic film (not shown) may be placed over the plate and the backing member to again form a package similar to the original package.

It will be seen that when the plate 12 is packaged as shown in FIG. 1, the backing member will provide protection against bending and other forces which might otherwise tend to crack or shatter the plate. Furthermore, by providing a marginal area between the perimeter of the plate and the perimeter of the backing member, not only is the plate essentially sealed against the ambient atmosphere, but the edges of the plate are protected against forces directed toward the sides and ends which might otherwise chip, crack or damage the plate. Recessing the plate within the backing member not only enhances protection against such lateral forces, but prevents slipping of the plate 12 relative to the backing member 30 during shipping and handling, which slipping could tear the film from the marginal area to which the film is adhered, thereby opening the package completely, or at least opening the seal around the perimeter of the plate. Additionally, the marginal area and the recess provide for the use of the spotting guide and migration gauge in facilitating a thin-layer chromatographic analysis. The seal serves to seal the adsorbent layer against the ambient atmosphere, and especially against moisture, and provides the important advantage of enabling the adsorbent layer to be "preactivated," i.e., heated to drive off moisture which should not be present in the adsorbent when the plate is used in an analysis, to be packaged in an activated state (relatively moisture free) and to remain in an activated state until the package is opened so that activation of the adsorbent layer by the user is not necessary.

It is to be understood that the above-detailed description of an embodiment of the invention is provided by way of example only. Various details of design and construction may be modified without departing from the true spirit and scope of the invention.

The embodiments of the invention in which an exclusive property or privilege is claimed are defined as follows:

1. A combination package and template including a thin-layer chromatographic plate, the plate having a perimeter of prescribed length and including a thin layer of chromatographic adsorbent, said combination comprising:

a backing member including a front surface having a perimeter of a length greater than the length of the perimeter of the plate to be packaged, said front surface having a first portion corresponding in area and configuration to the area and configuration of the plate to be packaged and at least one second portion forming a marginal area between the first portion and at least a portion of the perimeter of the front surface of the backing member;

indicia located in said marginal area for denoting locations on the adsorbent layer of the plate to be packaged;

means on the backing member for positively locating the plate upon the first portion of the front surface of the backing member in a predetermined position with respect to said indicia and for securing the plate in said predetermined position against movement relative to the backing member in all directions parallel to the front surface of the backing member; and a film of pliable plastic material overlying the first and second portions of said front surface and removably affixed to the backing member when the plate is in said predetermined position upon the backing member for removably retaining the plate in said predetermined position between the film and the backing member.

2. The combination of claim 1 wherein said means for positively locating and securing the plate includes a recess in the front surface of the backing member, said first portion being recessed relative to said second portion of the front surface and said second portion extending around the entire perimeter of the first portion of the front surface such that the perimeter of the recess corresponds to the perimeter of the plate.

3. The combination of claim 2 wherein the film is removably adhered to the second portion of the front surface of the backing member around the entire perimeter of the first portion thereof such that the plate will be sealed in the package around the entire perimeter of the plate when the plate is in said predetermined position between the film and the backing member.

4. The combination of claim 1 wherein:
the plate is rectangular and includes opposite sides and opposite ends;
the first portion of the front surface of the backing member has corresponding opposite sides and opposite ends;
the marginal area is juxtaposed with at least one side of said first portion; and
the indicia include a migration gauge juxtaposed with said one side of the first portion.

5. The combination of claim 4 wherein said means for positively locating the plate includes a recess in the front surface of the backing member, said first portion being recessed relative to said second portion of the front surface.

6. The combination of claim 1 wherein:
the plate is rectangular and includes opposite sides and opposite ends;
the first portion of the front surface of the backing member has corresponding opposite sides and opposite ends;
the marginal area is juxtaposed with at least one end of said first portion; and
the indicia include a spotting guide juxtaposed with said one end of said first portion.

7. The combination of claim 6 wherein said means for positively locating the plate includes a recess in the front surface of the backing member, said first portion being recessed relative to said second portion of the front surface.

8. The combination of claim 1 wherein:
the plate is rectangular and includes opposite sides and opposite ends;
the first portion of the front surface of the backing member has corresponding opposite sides and opposite ends;
the marginal area is juxtaposed with at least one side and one end of said first portion; and
the indicia include a migration gauge juxtaposed with said one side of the first portion and a spotting guide juxtaposed with said one end of the first portion.

9. The combination of claim 8 wherein said means for positively locating and securing the plate includes a recess in the front surface of the backing member, said first portion being recessed relative to said second portion of the front surface and said second portion extending around the entire perimeter of the first portion of the front surface such that the perimeter of the recess corresponds to the perimeter of the plate.

10. The combination of claim 9 wherein the film is removably adhered to the second portion of the front surface of the backing member around the entire perimeter of the first portion thereof such that the plate will be sealed in the package around the entire perimeter of the plate when the plate is in said predetermined position between the film and the backing member.

* * * * *

UNITED STATES PATENT OFFICE
CERTIFICATE OF CORRECTION

Patent No. 3,623,602     Dated November 30, 1971

Inventor(s) Anthony S. Valente

It is certified that error appears in the above-identified patent and that said Letters Patent are hereby corrected as shown below:

Column 1, line 13, "tion are" should read -- tion, are --; Column 1, line 20, "form" should read -- from --; Column 1, lines 64-65, "a backing...comprising" should be deleted; Column 3, line 16, "form" should read -- from --;

Signed and sealed this 9th day of May 1972.

(SEAL)
Attest:

EDWARD M. FLETCHER, JR.
Attesting Officer

ROBERT GOTTSCHALK
Commissioner of Patents